United States Patent
Stillwell et al.

[11] 3,894,400
[45] July 15, 1975

[54] MATERIAL REMOVAL DEVICE

[75] Inventors: Don Stillwell, Cuyahoga Falls, Ohio;
Sherrel Strahle, Greenfield, Ind.;
Art Hightower, Olmsted Falls, Ohio

[73] Assignee: Lee Turzillo Contracting Company, Brecksville, Ohio

[22] Filed: Jan. 28, 1974

[21] Appl. No.: 437,366

[52] U.S. Cl. ............... 61/63; 37/DIG. 6; 175/88; 198/65
[51] Int. Cl.[2] ................ E02D 17/144; E21B 3/02
[58] Field of Search ............ 61/63, 53.52, 56, 56.5, 61/53.64, 53.66; 198/65, 43, 64; 37/DIG. 6; 175/88, 207; 52/65, 73

[56] References Cited
UNITED STATES PATENTS

| | | | |
|---|---|---|---|
| 1,114,454 | 10/1914 | Petrow et al. | 198/65 |
| 2,557,049 | 6/1951 | Haines | 175/88 X |
| 3,791,464 | 2/1974 | Stewart | 175/88 |

FOREIGN PATENTS OR APPLICATIONS

| | | | |
|---|---|---|---|
| 761,722 | 11/1956 | United Kingdom | 175/88 |

*Primary Examiner*—Jacob Shapiro
*Attorney, Agent, or Firm*—Donnelly, Maky, Renner & Otto

[57] ABSTRACT

Device consists of a section of tubing or pipe which may be mounted on the leads or other suitable support structure of an auger ring assembly and positioned on the ground over the area in which a hole is to be drilled. When thus so positioned, the auger is in axial alignment with the pipe for insertion of the auger through the pipe and drilling into the ground. The pipe is of a length suitable to permit the spoil or other material resulting from the drilling operation to be carried upwardly by the spiral flights on the auger within the pipe a sufficient distance above ground for discharge and deposit in spaced relation from the hole. A hopper adjacent the upper end of the pipe collects the spoil spilling therefrom for discharge down a chute attached thereto. The angle of inclination of the chute may be adjusted to vary the angle of discharge and spacing between the auger and discharge end of the chute, and both the hopper and chute may be rotatable relative to the pipe to permit the spoil therefrom to be deposited at different locations.

9 Claims, 2 Drawing Figures

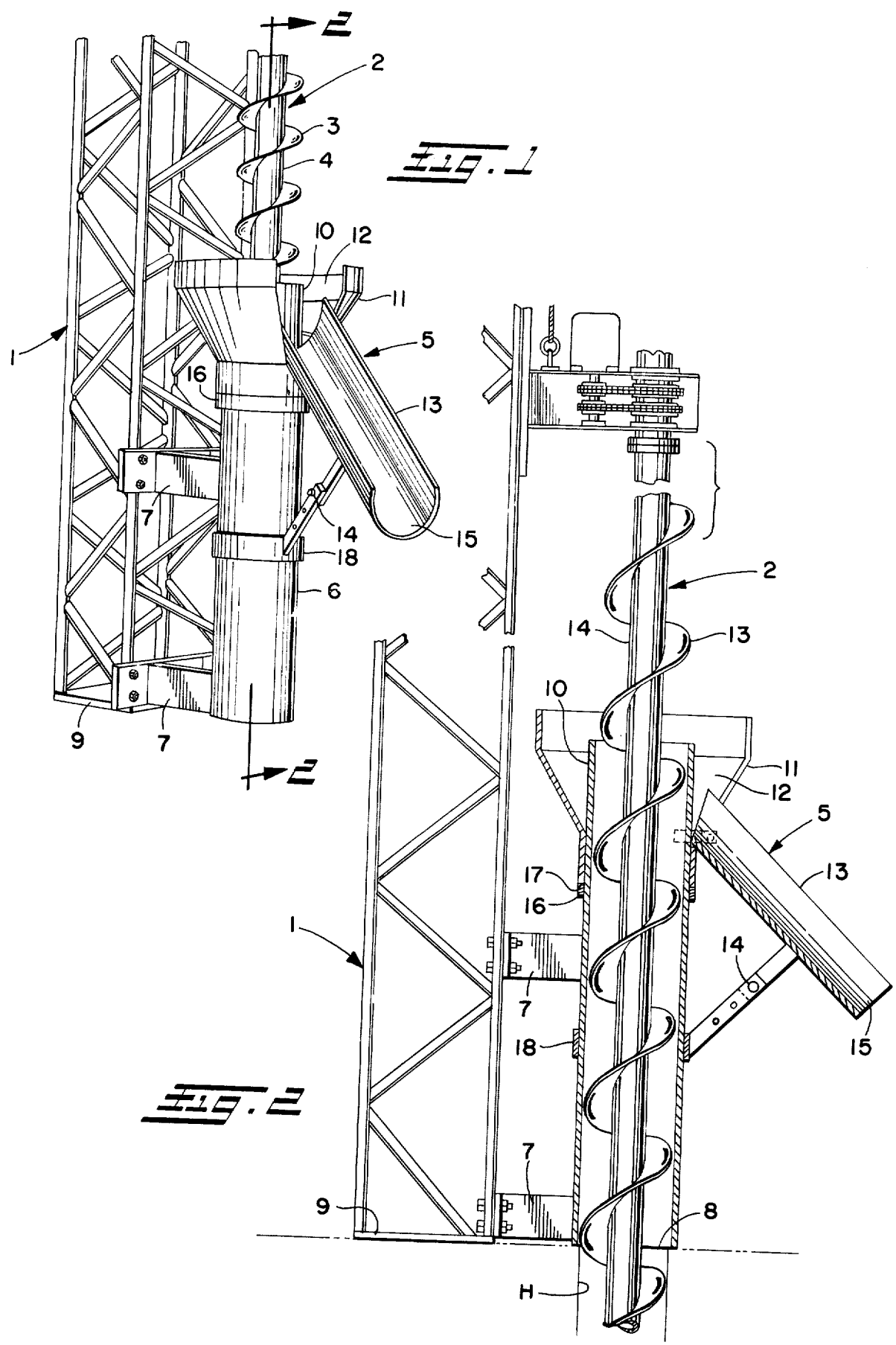

# 3,894,400

MATERIAL REMOVAL DEVICE

BACKGROUND OF THE INVENTION

This invention relates generally as indicated to a material removal device particularly for use in removing the spoil from the flights of an auger during drilling of a hole of predetermined depth in an earth situs and depositing such spoil in spaced relation from the hole being drilled.

In the construction of concrete piles and other like structures, it is common practice to use an auger to drill a hole of the requisite diameter and depth. During drilling of any such hole using an auger, the dirt or other spoil is carried upwardly out of the hole by the flights on the outer wall of the auger stem. Oftentimes the spoil will adhere to the auger flights and become packed thereon, thus necessitating removal of the spoil by hand with possible interruption of the drilling procedure depending on how tightly the spoil is packed on the auger flights. The spoil from the hole which does not adhere to the auger flights is deposited on the ground around the periphery of the hole and must ordinarily be removed to prevent the spoil from being subsequently picked up by the auger flights or falling back into the hole after the auger has been removed therefrom. The deposits of spoil around the hole is also usually removed so as not to interfere with any subsequent work which may have to be performed at the hole site.

Consequently, it has been the usual practice to position one or two workmen adjacent the foot of the drill rig whose job it is to remove the spoil from the auger flights and adjacent the top of the hole as the spoil is carried upwardly out of the hole by the auger flights. It is of course very costly to use skilled or semi-skilled labor for this purpose, and there is also some risk of injury to the workmen doing this work. Moreover, if the spoil becomes too tightly packed on the auger flights, it may be necessary to slow down or completely stop the drilling operation to permit the workmen to dig the spoil out from between the flights.

SUMMARY OF THE INVENTION

With the foregoing in mind, it is a principal object of this invention to provide a material removal device which provides for the removal of dirt and other material from a hole being drilled without the use of hand labor.

Another object is to provide such a material removal device for directing the spoil away from the flights of an auger during drilling and depositing the spoil on the ground some distance from the hole being drilled where the spoil can be picked up by conventional excavating equipment without damage to the hole or pile formed therein.

Still another object is to provide such a material removal device which readily permits depositing of the spoil picked up by the auger flights during drilling at different spaced locations from the hole.

Still another object is to provide such a material removal device which is maintained in proper alignment with the auger and mounted for ease of movement therewith from one hole location to another.

These and other objects of the present invention may be achieved by providing a material removal device in the form of a tube or pipe surrounding a portion of the auger flighting extending above ground level. The pipe is desirably supported by the same equipment on which the auger is mounted to maintain proper alignment of the pipe relative to the auger and facilitate movement of the device with the auger from one hole location to another. Although the length of the pipe may vary, it should be sufficient to permit the spoil from the hole to be carried upwardly by the spiral flights within the pipe a sufficient distance above ground level to facilitate deposit some distance from the hole where it will not interfere with any subsequent pile forming operations and the like and can be subsequently removed using conventional excavating equipment rather than hand labor without damage to the pile. A frusto-conical shape hopper collects the spoil spilling from the upper end of the pipe and directs the spoil down a discharge chute which may be adjusted to vary the angle of discharge and spacing between the auger and discharge end of the chute. Both the hopper and chute are also desirably rotatably supported by the pipe to permit the spoil to be discharged from the hopper in any direction desired for deposit at different locations.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE DRAWINGS

In the annexed drawings:

FIG. 1 is a perspective view of a preferred form of material removal device constructed in accordance with this invention shown mounted on the support member of a typical auger rig; and FIG. 2 is a vertical section through the material removal device of FIG. 1 taken on the plane of the line 2—2 thereof.

DESCRIPTION OF THE PREFERRED EMBODIMENT

Referring now in detail to the drawings, there is schematically shown a suitable support structure 1 of a conventional auger rig assembly which may be a mast or set of vertical leads suitably suspended from a crane or other rig for supporting an earth drilling auger 2. Suitable mechanism, not shown, such as shown schematically in FIG. 2 and more fully shown and described in U.S. Pat. No. 3,464,216 of Lee A. Turzillo, granted Sept. 2, 1969, is provided for rotating the auger 2 in either direction, and for permitting the auger to advance into the ground during rotation in a drilling direction to drill a hole of predetermined depth by outward displacement of earth by the auger flights 3, in a manner well known in the art.

Such an auger may be used, for example, to drill a hole for producing a reinforced concrete pile or like column in an earth situs, and the auger stem 4 may either be solid or hollow to permit introduction of pressurized grout or other hardenable cementitious fluid into the hole through the hollow auger stem. If the auger stem is hollow, a suitable closure member must also be used to close the lower end of the auger during the drilling operation, and a suitable reinforcing member may also be inserted into the hole through the hollow auger stem either before, during, or after the drilling operation is disclosed, for example, in U.S. Pat.

Nos. 3,363,422 and 3,464,216, which are incorporated herein by way of reference.

Also shown in the drawings is a preferred form of material removal device 5 constructed in accordance with this invention which desirably consists of an elongated tube or pipe 6 disposed in substantially vertical axial alignment with the auger 2. The pipe 2 is shown rigidly attached to the support member 1 for the auger 2 by suitable brackets 7 to maintain the proper axial alignment of the pipe relative to the auger and facilitate movement of the material removal device 5 with the auger from one hole location to another.

The bottom or lower end 8 of the pipe 6 is also desirably disposed in substantially the same horizontal plane as the bottom 9 of the support member 1 for the auger 3 so that when the support member is in proper position with the bottom thereof engaging the earth situs, the bottom of the pipe will also engage the earth situs at the desired hole location as shown. Of course, the lower end of the auger must be raised above the bottom of the support member 1 and pipe 6 when positioning the same at a new hole location so as not to interfere with such positioning, and the inner diameter of the pipe 6 must also be somewhat larger than the outer diameter of the auger flights 3 to permit the auger to pass through the pipe during the subsequent drilling operation.

As will be apparent, the disposition of the pipe 6 around the auger flights 3 adjacent the top of the hole H will cause the spoil which is removed from the hole by the auger flights during the drilling operation to be retained on the flights until the flights reach the upper end 10 of the pipe rather than permitting the spoil to be discharged from the flights immediately adjacent the top of the hole and accumulate around the periphery of the hole as is conventional practice. Although the length of the pipe may vary, it should be of sufficient length so that the flights will carry the spoil high enough above ground level to permit its deposit far enough away from the hole to prevent the spoil from falling back too closely adjacent the top of the hole. Depositing the spoil away from the hole also permits subsequent removal of the spoil from the job site using conventional excavating equipment instead of hand labor without damage to the hole or pile formed therein. The location of the pipe 6 around the auger 2 where it protrudes out of the ground has the further advantage of assisting in preventing cave-ins around the top of the hole.

A frusto-conical shape hopper 11 is telescoped over the upper end of the pipe and extends upwardly thereabove to collect the spoil spilling from the upper end of the pipe as the auger flights move therepast during the drilling operation. The hopper 11 has a discharge opening 12 on one side as shown, with a discharge chute 13 attached thereto for conveying the spoil from the hopper away from the auger. Preferably, the discharge chute is hingedly connected to the hopper, and an adjustable support member 14 is provided for the hopper permitting variations in the angle of inclination of the discharge chute and distance between the hole being drilled by the auger and the discharge end 15 of the chute. The hopper 11 and discharge chute 13 are also desirably rotatably supported on the pipe 6, as by providing an annular flange or shoulder 16 adjacent the upper end of the pipe on which the bottom edge 17 of the hopper is freely supported, and a freely slidable ring 18 surrounding the pipe to which one end of the adjustable support member 14 for the discharge chute 13 is hingedly connected. Making the hopper and chute rotatable relative to the pipe permits the direction of the discharge from the hopper to be changed at any time for depositing the spoil from the hole at different locations as desired so as to prevent too large an accumulation of the spoil at any one place.

From the foregoing, it will be apparent that the material removal device of the present invention provides a very simple and effective means for removing the spoil from the flights of an auger during drilling and depositing such spoil at various locations spaced from the hole so as to avoid an accumulation of material around the periphery of the hole.

The embodiments of the invention in which an exclusive property or privilege is claimed are defined as follows:

1. A material removal device for use in removing the spoil from the flights of an auger and the like during drilling comprising a pipe having an inner diameter slightly larger than the outer diameter of the auger flights, means for positioning said pipe in axial alignment with the auger with the lower end of said pipe in engagement with an earth situs, said pipe enclosing a portion of the auger during drilling to permit the spoil from the drilling operation to be carried upwardly by the auger flights within said pipe to the upper end thereof, a hopper adjacent the upper end of said pipe for receiving the spoil spilling from the upper end of said pipe, and means for conveying the spoil spilling from the upper end of said pipe comprising a discharge chute attached to said hopper, said hopper having an opening in communication with said discharge chute, and means mounting said hopper and discharge chute for rotation relative to said pipe to permit the spoil to be discharged from said hopper in different directions for deposit at different locations without having to rotate said pipe.

2. The device of claim 1 wherein said means mounting said hopper and discharge chute for rotation relative to said pipe comprises a flange on the outer wall of said pipe spaced from the upper end thereof, said hopper being telescopingly received over the upper end of said pipe with the lower end of said hopper resting on said flange and the upper end of said hopper extending upwardly beyond the upper end of said pipe.

3. The device of claim 2 further comprising a freely slidable ring surrounding said pipe below said flange, and an adjustable support member including means providing a pivotal connection between said ring and discharge chute for adjusting the angle of inclination of said discharge chute.

4. The device of claim 1 further comprising means for varying the angle of inclination of said discharge chute to vary the slope of said discharge chute and spacing between said pipe and discharge end of said discharge chute.

5. A material removal device for use in removing the spoil from the flights of an auger and the like during drilling of a hole in an earth situs comprising an auger having auger flights thereon, a pipe having an inner diameter slightly larger than the outer diameter of said auger flights, means for positioning said pipe in axial alignment with said auger and maintaining the lower end of said pipe in engagement with the upper surface of the earth situs, means mounting said auger for axial and rotational movement relative to said pipe for drilling a hole in the earth situs while the lower end of said pipe is maintained in engagement with the upper surface of the earth situs, said pipe surrounding and enclosing a portion of said auger during drilling to permit the spoil from the drilling operation to be carried upwardly by the auger flights within said pipe to the upper end thereof, and means for conveying away the spoil spilling from the upper end of said pipe.

6. The device of claim 5 further comprising a support member for said pipe, and means mounting said support member for movement from one location to another to position said pipe at different hole locations.

7. The device of claim 6 wherein said support member also supports said auger to maintain said pipe in proper axial alignment with said auger and facilitate movement of said device and auger from one hole location to another.

8. The device of claim 5 further comprising a hopper adjacent the upper end of said pipe for receiving the spoil spilling from the upper end of said pipe, said means for conveying the spoil spilling from the upper end of said pipe comprising a discharge chute attached to said hopper, said hopper having an opening in communication with said discharge chute.

9. The device of claim 5 wherein the hole drilled by said auger has a diameter smaller than the outer diameter of said pipe.

* * * * *